United States Patent [19]
Freudenberg

[11] Patent Number: 5,092,566
[45] Date of Patent: Mar. 3, 1992

[54] RUBBER BEARING HAVING HYDRAULIC DAMPING MEANS

[75] Inventor: Tillman Freudenberg, Weinheim, Fed. Rep. of Germany

[73] Assignee: Firma Carl Freudenberg, Weinheim, Fed. Rep. of Germany

[21] Appl. No.: 565,632

[22] Filed: Aug. 10, 1990

[30] Foreign Application Priority Data

Aug. 12, 1989 [DE] Fed. Rep. of Germany ....... 3926696

[51] Int. Cl.$^5$ .............................................. F16F 9/08
[52] U.S. Cl. .................................. 267/140.1; 267/219
[58] Field of Search ............... 180/300, 312, 902; 248/562, 636, 550; 267/140.1, 219

[56] References Cited

U.S. PATENT DOCUMENTS

| | | | |
|---|---|---|---|
| 4,650,169 | 3/1987 | Eberhard et al. | 267/140.1 |
| 4,700,931 | 10/1987 | Eberhard et al. | 180/902 X |
| 4,779,585 | 10/1988 | Behrens et al. | 248/636 X |
| 4,789,142 | 12/1988 | Hoying et al. | 267/140.1 |
| 4,793,600 | 12/1988 | Kojima | 267/140.1 |
| 4,805,884 | 2/1989 | Jordens et al. | 248/636 X |
| 4,886,251 | 12/1989 | Häussermann | 267/140.1 |
| 4,901,986 | 2/1990 | Smith | 267/219 X |

FOREIGN PATENT DOCUMENTS

| | | | |
|---|---|---|---|
| 271894 | 6/1988 | European Pat. Off. | 180/300 |
| 2906282 | 8/1980 | Fed. Rep. of Germany | 248/562 |

Primary Examiner—Robert J. Oberleitner
Assistant Examiner—Alfred Muratori
Attorney, Agent, or Firm—Kenyon & Kenyon

[57] ABSTRACT

A hydraulically damped rubber bearing has a working chamber defined by a rubber-elastic spring member, a bearing member, a journal bearing, and an end wall, which is flexibly movable in the direction of the working chamber. The end wall is provided with an elastic suspension mount that can be forced into abutment with a stop surface in dependence upon predetermined parameters. The suspension mount is connected directly to the journal bearing and the stop surface is formed as a rigid part of the journal bearing. A control device selectively permits free movement of the end wall when acoustically disturbing vibrations are introduced into the bearing.

12 Claims, 2 Drawing Sheets

RUBBER BEARING HAVING HYDRAULIC DAMPING MEANS

BACKGROUND OF THE INVENTION

The invention relates generally to hydraulically damped rubber bearings and more particularly, to an improved hydraulically damped rubber bearing having a control device selectively permitting free movement of the end wall of the working chamber to insulate acoustic vibrations introduced in the bearing.

In DE-OS 34 47 950, a hydraulically damped rubber bearing is disclosed in which the working chamber is defined by a rubber-elastic spring member, a bearing member, a journal bearing and an end wall that is flexible in the direction of the working chamber. The end wall is provided with an elastic suspension mount that can be displaced against a stop surface in dependence upon predetermined parameters. The edges of the elastic suspension mount of the flexible end wall are fixed in a partition wall, which in turn is flexibly supported in the direction of the working chamber. When vibrations are introduced into the rubber bearing, a constant variation in the relative displacement of the end wall and the cavity results. The end wall is defined at the rear by a cavity, the base of which constitutes the stop surface. When acoustically disturbing vibrations are introduced, the rear surface of the end wall is brought into engagement with the stop face through the evacuation of the cavity. The amount of insulation achieved when acoustic vibrations are introduced into a bearing of this type is not very satisfactory.

Hence, one of the problems to which the invention is directed is to further develop a rubber bearing of the general type discussed above so that considerably improved insulation of acoustic vibrations is achieved.

SUMMARY OF THE INVENTION

The invention solves this problem by providing a hydraulically damped rubber bearing having a bearing member for connecting the rubber bearing to a first part, which may be an engine of a motor vehicle, and a journal bearing for connecting the rubber bearing to a second part, which may be the frame of the motor vehicle. An elastic spring member is disposed between the bearing member and the journal bearing and an end wall is connected to the journal bearing. A working chamber for containing hydraulic fluid is defined by the bearing member, journal bearing, elastic spring member, and the end wall. An elastic suspension mount provided on the end wall directly connects the end wall to the journal bearing in a first direction towards the working chamber. A rigid stop surface is provided on the journal bearing for limiting the movement of the end wall in a second direction away from the working chamber. A control device selectively permits free movement of the end wall in the first and second directions to insulate acoustic vibrations introduced into the rubber bearing.

The flexible suspension mount is connected directly to the journal bearing, the stop surface is provided as a rigid part of the journal bearing, and the end wall is controlled by the control device such that it is freely movable when acoustically disturbing vibrations are introduced. As a result of the direct, reciprocal connection between the suspension mount and the journal bearing, the end wall is mounted in an essentially constant position within the working chamber. The pressure waves induced within the working chamber when the acoustically disturbing vibrations are introduced reach the end wall after a generally constant travel time. This favors the development of synchronous pulsating movements of the end wall, which considerably improves the amount of insulation against acoustically disturbing vibrations.

Furthermore, reciprocal connection between the suspension mount and the journal bearing makes it possible to enlarge to a considerable degree the surface that acts as a piston surface. Without any difficulty, this piston surface can be enlarged to a greater than the areas of the piston surfaces of the elastic spring member and the bearing member. The amplitude of the evading movement of the end wall that results from a spring deflection of the bearing member is reduced accordingly. This plays a decisive role in compensating for the pressure variations generated when acoustically disturbing vibrations are introduced. To achieve this, the control device of the invention permits movement of the end wall when acoustic vibrations are introduced. The control device may accomplish this, for example, through the use of sensors, which are installed directly at the source of the acoustic vibrations. Appropriate sensors, which are well known in the art, may be used and are not the object of the present invention.

The rubber bearing of the invention is particularly well suited for application in a bearing arrangement of an internal combustion engine in a motor vehicle. The signal required for controlling the relative mobility of the end wall can be extracted from the firing signal, obviating the need for separate sensor elements.

To suppress vibrations of the supported machine part that may increase due to resonance effects, the rubber bearing of the invention is provided with a hydraulic damping device. This damping device can be any of several known devices, such as a displacement disk, throttle ports, or the like.

To control the relative mobility of the end-limiting wall, known actuators can be used, such as those which are operated mechanically, hydraulically, or pneumatically. It is likewise possible to use a combination of these elements.

To achieve fast switching between the two modes of operation of the end wall, it has proven to be advantageous to design the central region of the end wall as a fully rigid member. If the end wall is made of metal, for example, only the suspension mount is elastically deformable. As such, the edges of the suspension mount surround the end wall and are connected at its outer circumferential region to the journal bearing, for example, by means of an enlargement, such as a bead, situated in a groove having a corresponding cross-section.

To avoid impact noises, as well provide unimpeded relative mobility of the end wall, it is advantageous for the stop surface to be confined to the area of the suspension mount. In this case, the mutual clearance between the suspension mount and the stop surface in the neutral or freely movable position of the end wall is expediently dimensioned to constantly increase in the radially inward direction. This also helps make the movement of the suspension mount more uniform during operation.

It is beneficial for the thickness of the suspension mount to increase in the radial inward direction toward the inside of the bearing. This characteristic is especially important to ensure a uniform flexing strain of the suspension mount over its entire surface, which is important to enhance its surface life.

Further features, advantages, and embodiments of the invention are apparent from consideration of the following detailed description, drawings, and appended claims.

DETAILED DESCRIPTION

Figure 1:
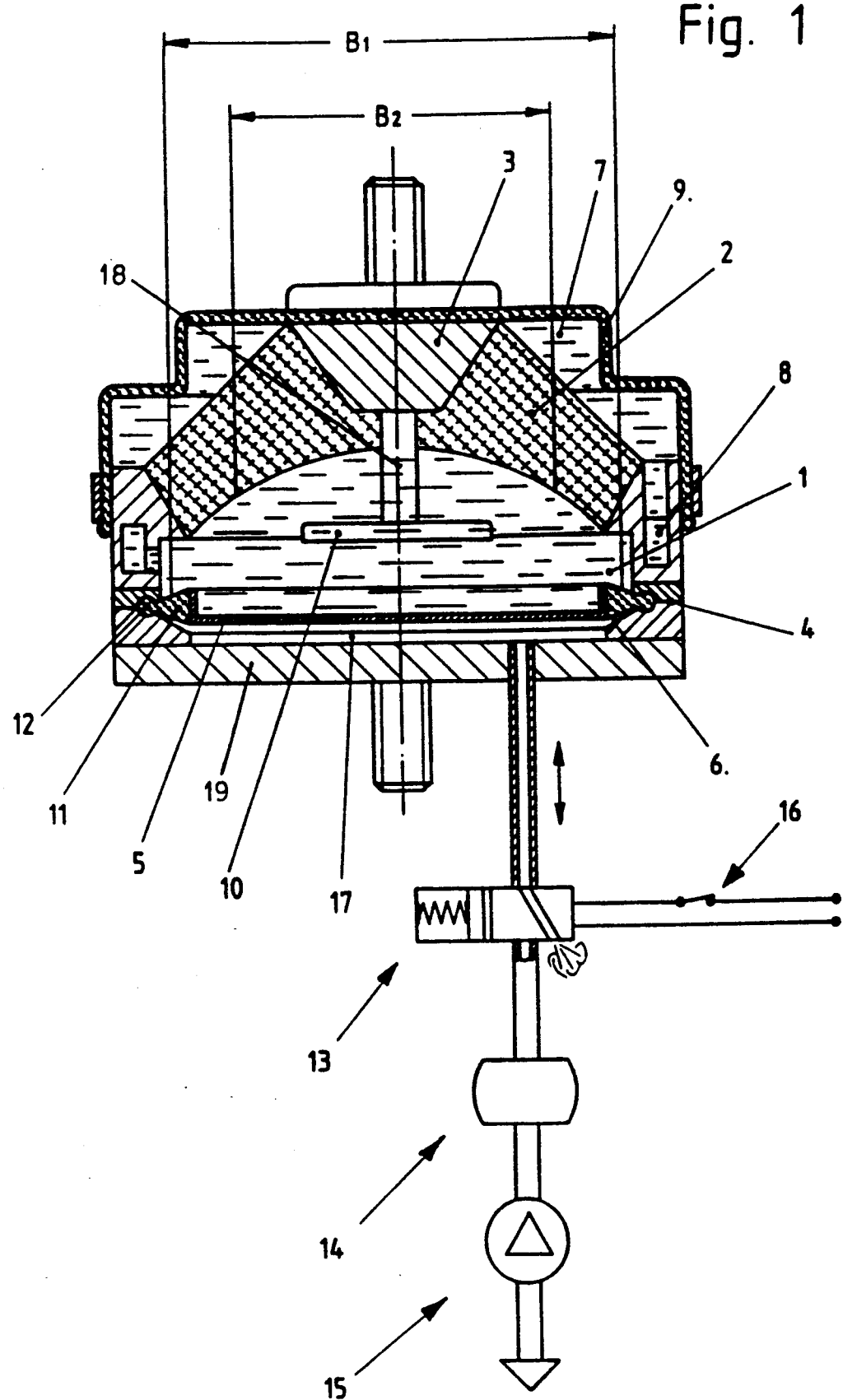
FIG. 1 is a cross sectional view of a hydraulically damped rubber bearing constructed according to the principles of the invention.

The rubber bearing depicted in FIG. 1 is provided with a hydraulic damping device, which comprises a working chamber 1, defined by a rubber-elastic spring member 2, a bearing member 3, a journal bearing 4, as well as an end wall 5, which is flexible in the direction of the working chamber 1. The end wall 5 is provided with an elastic suspension mount 11, and can be selectively displaced against a stop surface 6 formed on the journal bearing in dependence upon certain predetermined parameters. The suspension mount 11 of the end wall 5 is connected directly to the journal bearing 4. The stop surface 6 is provided as a rigid part of the journal bearing 4 such that end wall 5 may be controlled in a freely movable fashion when acoustically disturbing vibrations are introduced. The working chamber 1 communicates by way of a duct-type damping opening 8 with a compensation chamber 7. The working chamber 1, as well as the damping opening 8 and the compensation chamber 7, are completely filled with hydraulic fluid.

The compensation chamber 7 is sealed to the outside by a deformable member, such as bellows 9. As a result, it is suited for absorbing additional liquid volumes in a pressureless manner. After the initial static load to be borne is applied to the bearing member 3, no significant pressure rise ensues in the working chamber 1, damping opening 8, or compensation chamber 7.

The bearing member 3 is connected via a column-type projection 18 to a displacement disk 10, which is displaced within the working chamber 1. The end wall 5 consists of a cup-shaped, deep-drawn part made of sheet steel, which is connected at its edges to an elastic suspension mount 11. On its outer periphery, this suspension mount 11 has a surrounding one-piece, premolded enlargement or bead 12, which is held in a groove within the journal bearing having a corresponding profile. The piston-type pressurizing surface of the end wall 5, inclusive of the relatively movable part of the suspension mount 11, is designated in FIG. 1 as B1. The piston type pressurizing surfaces of the bearing member 3 and of the relatively movable part of the elastic spring member 2 is designated as B2, which is clearly shown as being smaller than B1.

The elastic suspension mount 11 of the end wall 5 has an essentially triangular cross-sectional shape. This ensures a uniform sequence of movements when the bearing member 3 is spring-deflected.

The rear of end wall 5, journal bearing 4, which includes a bottom plate 19, define a cavity 17, which communicate via conduit and electromagnetic control valve 13 with the atmosphere. As a result, the end wall 5 readily follows the pressure waves resulting from the introduction of acoustically disturbing vibrations into the bearing member 3 to compensate for pressure variations. In this manner, the transmission through the rubber bearing of detrimental vibrations, in particular, vibrations caused by sound waves passing through solids, is prevented to the greatest extent possible.

When relative movements are introduced into the bearing member that can result in vibratory deflections (of the machine part supported on the rubber bearing) of increased resonance, a sensor actuated switch 16 is opened. The opening of the switch then allows valve 13 to assume a second position in which the cavity 17 is in communication with a vacuum accumulator 14 and a vacuum pump 15. This results in a sudden drop in pressure in the cavity 17. The vacuum forces the suspension mount 11 into abutment with the rigid stop surface 6. As a result, the end wall 5 is immobilized, which means that any vibrations introduced in the bearing cause a back and forth movement of hydraulic fluid between the working chamber 1 and the compensation chamber 7 via the damping opening 8. The vibrations thereby are damped. After these vibrations fade away, switch 16 closes and the control valve 13 returns to its original position allowing cavity 17 to once again communicate with the atmosphere, thereby permitting the relative movement of the end wall 5 to insulate vibrations.

Figure 2:
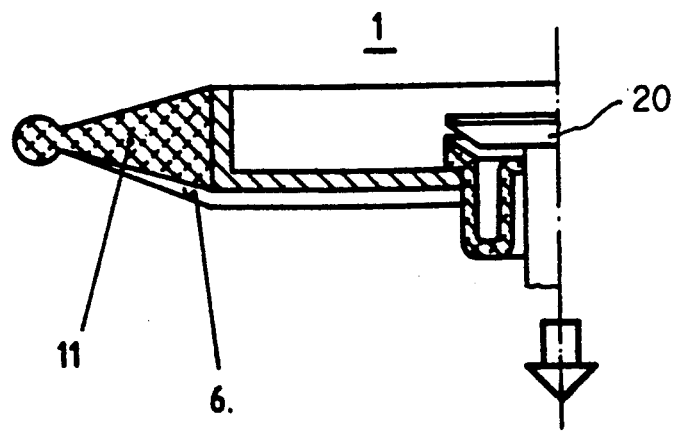
FIGS. 2 and 3 depict two alternative embodiments of auxiliary means for forcing the end wall into abutment with the stop surface.
Figure 3:
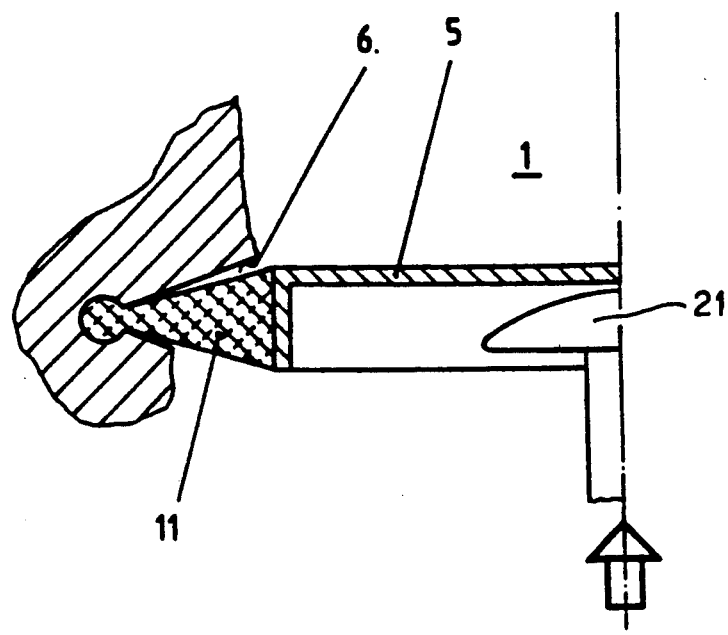

Two alternative embodiments of end walls 5 are depicted in FIGS. 2 and 3. These embodiments depict alternate ways to force the suspension mount into abutment with the stop surface. In the embodiment of FIG. 2, draw punch 20 mounted in the end wall can be used to pull downwardly on the end wall until the suspension mount abuts the stop surface. In the embodiment of FIG. 3 a pressure stamp 21 is used to push the end wall upwardly against a stop surface. In the embodiment of FIG. 2, the stop surface 6 is oriented in the same manner as the embodiment shown in FIG. 1, i.e., with the stop surface formed on the side of the end wall 5 opposite the working chamber 1. In the embodiment of FIG. 3, the stop surface 6 is provided in front of the end wall on the side facing in the direction of the working chamber 1. In both cases, these auxiliary devices for blocking the mobility of the end wall may be actuated mechanically or electromechanically.

What is claimed is:

1. A hydraulically damped rubber bearing comprising:

a bearing member for connecting the hydraulically damped rubber bearing to a first part;

a journal bearing for connecting the hydraulically damped rubber bearing to a second part;

an elastic spring member disposed between said bearing member and said journal bearing;

an end wall connected to said journal bearing;

a working chamber for containing hydraulic fluid, said working chamber being defined by said bearing member, said journal bearing, said elastic spring member, and said end wall;

an elastic suspension mount provided on said end wall and directly connecting said end wall to said journal bearing for flexible movement relative to the journal bearing in a first direction;

a rigid stop surface having the shape of a generally ring-like, conical element provided on said journal bearing for limiting the movement of said end wall in a second direction opposite the first direction; and a control device selectively permitting free movement of said end wall to insulate acoustic vibrations introduced into the hydraulically damped rubber bearing.

2. The hydraulically damped rubber bearing of claim 1 wherein said first part is connected to an internal combustion engine of a motor vehicle and said second part is connected to a supporting member of the motor vehicle.

3. The hydraulically damped rubber bearing of claim 1, further comprising a flexible member connected to said journal bearing and in a position surrounding said elastic spring member to define a compensation chamber therebetween.

4. The hydraulically damped rubber bearing of claim 1, wherein said control device includes a draw punch selectively operable to displace said end wall into abutment with said rigid stop surface.

5. The hydraulically damped rubber bearing of claim 1, wherein said control device includes a pressure stamp selectively operable to displace said end wall into abutment with said rigid stop surface.

6. The hydraulically damped rubber bearing of claim 1, further comprising a displacement disk connected to at least one of the bearing member and the elastic spring member, said displacement disk extending into said working chamber whereby movement of said displacement disk through hydraulic fluid contained in said working chamber dampens vibrations introduced into the bearing.

7. A hydraulically damped rubber bearing comprising:
a bearing member for connecting the hydraulically damped rubber bearing to a first part;
a journal bearing for connecting the hydraulically damped rubber bearing to a second part;
an elastic spring member disposed between said bearing member and said journal bearing;
an end wall connected to said journal bearing;
a working chamber for containing hydraulic fluid, said working chamber being defined by said bearing member, said journal bearing, said elastic spring member, and said end wall;
an elastic suspension mount provided on said end wall and directly connecting said end wall to said journal bearing for flexible movement relative to the journal bearing in a first direction;
a rigid stop surface provided on said journal bearing for limiting the movement of said end wall in a second direction opposite the first direction;
a control device selectively permitting free movement of said end wall to insulate acoustic vibrations introduced into the hydraulically damped rubber bearing.
a flexible member connected to said journal bearing and in a position surrounding said elastic spring member to define a compensation chamber therebetween; and
wherein said journal bearing contains a channel for communicating hydraulic fluid between the working chamber and the compensation chamber to allow movement of hydraulic fluid therebetween to damp vibrations introduced into the hydraulically damped bearing when said control device is operated to prevent movement of said end wall by forcing said end wall into abutment with said rigid stop surface.

8. The hydraulically damped rubber bearing of claim 7, wherein said elastic suspension mount flexibly connects said end wall to said journal bearing such that an air chamber is formed between said journal bearing, said elastic suspension mount, and said end wall, and said control device comprises a valve communicating with said air chamber, said valve having a first position in which said air chamber communicates with atmosphere and a second position in which said air chamber communicates with a source of vacuum thereby forcing said end wall into abutment with said rigid stop surface, whereby free movement of the end wall to insulate acoustic vibrations is permitted when said valve occupies its first position and movement of the end wall is prevented to ensure damping of vibrations when said valve occupies its second position.

9. The hydraulically damped rubber bearing of claim 8, wherein said elastic suspension mount comprises an annular member having an inner periphery connected to said end wall and an outer periphery formed as an annular bead, said journal bearing including an annular recess in which said annular bead is received.

10. The hydraulically damped rubber bearing of claim 9, wherein said journal bearing comprises a first generally cylindrical member in which said channel is formed, second and third generally cylindrical members together forming said annular recesses, and an end plate forming a bottom portion of said air chamber.

11. The hydraulically damped rubber bearing of claim 10 wherein said first part is an internal combustion engine of a motor vehicle and said second part is a supporting member of the motor vehicle.

12. A hydraulically damped rubber bearing comprising:
a bearing member for connecting the hydraulically damped rubber bearing to a first part;
a journal bearing for connecting the hydraulically damped rubber bearing to a second part;
an elastic spring member disposed between said bearing member and said journal bearing;
an end wall connected to said journal bearing;
a working chamber for containing hydraulic fluid, said working chamber being defined by said bearing member, said journal bearing, said elastic spring member, and said end wall;
an elastic suspension mount provided on said end wall and directly connecting said end wall to said journal bearing for flexible movement relative to the journal bearing in a first direction;
a rigid stop surface having a generally ring-like shape provided on said journal bearing for limiting the movement of said end wall in a second direction opposite said first direction; and means for controlling the movement of the end wall to permit free movement thereof when acoustic vibrations are introduced into the hydraulically damped rubber bearing.

* * * * *